(12) United States Patent
Alawadi

(10) Patent No.: US 12,155,777 B2
(45) Date of Patent: Nov. 26, 2024

(54) SECURE AUTHENTICATION

(71) Applicant: CIFR.IO LIMITED, Liverpool (GB)

(72) Inventor: Ali Alawadi, St Helens (GB)

(73) Assignee: CIFR.IO Limited, Liverpool (GB)

( * ) Notice: Subject to any disclaimer, the term of this patent is extended or adjusted under 35 U.S.C. 154(b) by 0 days.

(21) Appl. No.: 18/417,253

(22) Filed: Jan. 19, 2024

(65) Prior Publication Data
US 2024/0250828 A1 Jul. 25, 2024

Related U.S. Application Data

(60) Provisional application No. 63/440,392, filed on Jan. 21, 2023.

(51) Int. Cl.
H04L 9/32 (2006.01)
H04L 9/30 (2006.01)

(52) U.S. Cl.
CPC .......... H04L 9/3247 (2013.01); H04L 9/3073 (2013.01)

(58) Field of Classification Search
USPC ....................................................... 713/176
See application file for complete search history.

(56) References Cited

U.S. PATENT DOCUMENTS

| | | | | |
|---|---|---|---|---|
| 6,192,029 B1 * | 2/2001 | Averbuch | ................ | H04W 8/04 370/230 |
| 6,317,584 B1 * | 11/2001 | Abu-Amara | ....... | H04B 7/18589 455/12.1 |
| 8,295,811 B1 * | 10/2012 | Gailloux | ........... | H04M 3/42144 455/418 |
| 10,325,464 B1 * | 6/2019 | Trivelpiece | ............ | G07G 1/009 |
| 10,965,474 B1 * | 3/2021 | Benson | ................. | H04L 9/3271 |
| 11,895,183 B2 * | 2/2024 | Dekel | ................... | H04L 47/783 |
| 2003/0200181 A1 * | 10/2003 | van Kessel | ............ | G06Q 30/06 705/73 |
| 2005/0017844 A1 * | 1/2005 | Cole | ........................ | H04L 9/32 340/5.61 |
| 2006/0242404 A1 * | 10/2006 | Su | ........................ | G06Q 20/027 713/150 |
| 2007/0136583 A1 * | 6/2007 | Diorio | .................... | G06Q 10/08 713/168 |
| 2008/0001752 A1 * | 1/2008 | Bruns | .................... | G06Q 10/08 340/572.1 |
| 2008/0075096 A1 * | 3/2008 | Wagner | ................. | H04L 69/163 370/401 |
| 2009/0045911 A1 * | 2/2009 | Bauchot | ............ | G06Q 20/3674 340/5.8 |
| 2009/0061934 A1 * | 3/2009 | Hauck | ................... | H04W 8/265 455/558 |

(Continued)

FOREIGN PATENT DOCUMENTS

| | | | | |
|---|---|---|---|---|
| EP | 2487629 | A1 | 8/2012 | |
| EP | 3937421 | A1 * | 1/2022 | ......... H04L 63/0428 |

(Continued)

Primary Examiner — Kambiz Zand
Assistant Examiner — Mahabub S Ahmed
(74) Attorney, Agent, or Firm — Henry Patent Law Firm PLLC

(57) ABSTRACT

According to the present disclosure, there is provided an improved method for quickly, efficiently and securely confirming the authenticity of an identification tag. There is also provided an identification tag for use with the method, and a system for implementing the method.

17 Claims, 3 Drawing Sheets

(56) References Cited

U.S. PATENT DOCUMENTS

| | | | |
|---|---|---|---|
| 2009/0096574 A1* | 4/2009 | Oberle | H04L 9/3226 340/5.8 |
| 2009/0138275 A1* | 5/2009 | Maytal | G06Q 30/018 705/317 |
| 2010/0029247 A1* | 2/2010 | De Atley | H04W 12/06 455/411 |
| 2010/0155475 A1* | 6/2010 | Paek | G06F 21/34 235/439 |
| 2010/0161999 A1* | 6/2010 | Poovendran | H04L 9/3236 713/189 |
| 2010/0223663 A1* | 9/2010 | Morimoto | G07C 9/257 726/5 |
| 2010/0325720 A1* | 12/2010 | Etchegoyen | H04L 63/101 726/17 |
| 2010/0327060 A1* | 12/2010 | Moran | G07D 7/128 235/440 |
| 2011/0093703 A1* | 4/2011 | Etchegoyen | G06F 21/57 713/168 |
| 2013/0290714 A1* | 10/2013 | Hans | H04L 9/3273 713/168 |
| 2015/0076218 A1* | 3/2015 | Wood | G06Q 30/0185 235/375 |
| 2015/0254677 A1* | 9/2015 | Huxham | G06F 21/10 705/14.66 |
| 2016/0183081 A1* | 6/2016 | Flores Cuadrado | H04M 15/50 455/558 |
| 2016/0294569 A1* | 10/2016 | Chen | H04M 15/66 |
| 2016/0295028 A1* | 10/2016 | Chen | H04M 15/881 |
| 2017/0017947 A1* | 1/2017 | Robinton | G06Q 20/40 |
| 2017/0032382 A1* | 2/2017 | Shulman | G06K 7/10861 |
| 2017/0094508 A1* | 3/2017 | Felt | H04L 67/141 |
| 2018/0092143 A1* | 3/2018 | Gogineni | H04W 76/10 |
| 2018/0191746 A1* | 7/2018 | De Knijf | H04L 43/0876 |
| 2018/0374328 A1* | 12/2018 | Man | G08B 13/2485 |
| 2019/0116046 A1* | 4/2019 | Hoyer | H04L 9/0643 |
| 2020/0358787 A1* | 11/2020 | Barker | H04L 63/123 |
| 2021/0281395 A1* | 9/2021 | Narayanaswami | H04L 9/3247 |
| 2021/0342664 A1* | 11/2021 | Balgañón Canela | H04W 12/069 |
| 2022/0311598 A1* | 9/2022 | Yankilevich | H04L 9/0631 |
| 2022/0398601 A1* | 12/2022 | Anastas | G06K 19/0723 |
| 2023/0052463 A1* | 2/2023 | Spivack | G07D 7/0043 |
| 2023/0336530 A1* | 10/2023 | Roy | H04L 63/0884 |
| 2023/0396430 A1* | 12/2023 | Meyers | G07F 17/3241 |

FOREIGN PATENT DOCUMENTS

| | | | | |
|---|---|---|---|---|
| EP | 3998743 A1 * | 5/2022 | | G06F 16/9566 |
| WO | 2014/140807 A2 | 9/2014 | | |
| WO | WO-2019036073 A1 * | 2/2019 | | G06F 21/44 |

\* cited by examiner

SECURE AUTHENTICATION

CROSS-REFERENCE TO RELATED APPLICATIONS

This application claims priority to U.S. Application No. 63/440,392, entitled "Authentication System," filed Jan. 21, 2023, the contents of which are hereby incorporated by reference.

FIELD OF THE INVENTION

The present invention relates to secure authentication technologies, and specifically to providing a secure authentication method for authenticating the identity of a hardware device.

BACKGROUND

In today's global marketplace, the proliferation of counterfeit products poses a significant threat to consumer safety, brand integrity, and economic stability. The need for a robust and foolproof method of authenticating products has never been more pressing, particularly in industries where counterfeiting is prevalent.

Conventional authentication methods, often employed to secure devices and products, are susceptible to a range of counterfeiting techniques, both sophisticated and more straightforward. High quality counterfeit products can be extremely difficult to identify, often requiring expert analysis to confirm. Counterfeiting exploits vulnerabilities in existing authentication systems and methods, compromising the quality of products and the trust consumers place in the authenticity of products.

There is a need, therefore, to provide an improved secure authentication system in order to quickly and efficiently confirm the authenticity of a product with a high degree of certainty.

SUMMARY OF INVENTION

This disclosure provides an improved method for quickly, efficiently and securely confirming the authenticity of an identification tag. There is also provided an identification tag for use in this method, and a system for implementing the method.

According to a first aspect, there is provided a method for using a remote database to authenticate an identification tag, the method comprising steps of: obtaining from the identification tag an identification code and a tag authentication code, wherein the tag authentication code corresponds to the number of times the identification tag has previously been authenticated using the remote database; using the identification code to obtain a database authentication code from the remote database, wherein the database authentication code corresponds to the number of times the identification tag has previously been authenticated using the remote database; and comparing the database authentication code to the tag authentication code to determine if the identification tag is authentic and, if the identification tag is determined to be authentic, performing the further steps of: updating the database authentication code such that it corresponds to the number of times the identification tag has been authenticated; and updating the tag authentication code such that it corresponds to the number of times the identification tag has been authenticated.

The identification code is a unique (or pseudo-unique) identifier, which is stored by the identification tag and which can be used to identify the identification tag. The tag authentication code corresponds to the number of times that the identification tag has previously been authenticated. The identification code and the tag authentication code are stored by the identification tag, and may be provided in response to a query. In combination, the identification code and the tag authentication code provide a record of the identity of the identification tag and the number of times that the identification tag has been authenticated using the remote database.

The remote database is stored external to the identification tag. The remote database will typically store a large number of identification codes, each corresponding to a different identification tag. The remote database will also typically store a database authentication code corresponding to each identification tag. Each database authentication code corresponds to the number of times that the respective identification tag has been authenticated using the remote database.

Using the identification code obtained from an identification tag, the corresponding database authentication code can be looked up in the remote database. The database authentication code is then compared to the tag authentication code. Each of the database authentication code and the tag authentication code correspond to the number of times the tag has been authenticated using the remote database. In a situation where the tag is authentic, and where no attempts have been made to tamper with or otherwise circumvent the authenticity of the tag, the database authentication code and the tag authentication code should be in agreement with each other regarding the number of times that the identification tag has been authenticated using the remote database.

The method according to the first aspect is advantageous as it prevents the possibility of an inauthentic identification tags from being produced, since the identification code of the inauthentic identification tag will not be present in the remote database.

The method is further advantageous as it also prevents the possibility of duplicate identification tags from both being authenticated. This is because after the first tag is authenticated, the database authentication code corresponding to the identification code of the first identification tag will be updated to reflect the number of times the first identification tag has been authenticated. Any subsequent attempts to authenticate the duplicate tag would not be successful, since the tag authentication code of the duplicate tag would no longer correspond to the database authentication code. This means that duplicate identification tags can be identified quickly, and action can be taken to prevent any inauthentic duplicate tags from being authenticated.

In an embodiment, the remote database is a distributed ledger. A distributed ledger is a database of information that is maintained by the consensus of replicated, shared, and synchronized digital data that is typically geographically spread (distributed) across many sites, countries, or institutions. Distributed ledgers lack a central point of authority, making it very difficult for a hostile party to tamper with the data stored within the ledger. This is advantageous as it means that the information stored within the ledger, including the identification codes and corresponding database authentication codes, is secure and cannot be tampered with.

In an embodiment, the distributed ledger comprises one or more blockchains. Blockchains contain a list of records stored within blocks, which are linked together using cryptographic hashing. Each block contains information about the previous block, meaning that previously recorded blocks cannot be altered without altering every subsequent block.

This is advantageous as it provides additional security to prevent tampering with information stored in the distributed ledger, including the identification codes and corresponding database authentication codes.

In an embodiment, the remote database comprises a centralised database. This may be advantageous in that a centralised database can be more easily monitored and managed. This may also be advantageous because a centralised database can generally be updated more quickly than a distributed ledger.

In an embodiment, the obtained identification code is digitally signed by the identification tag, and wherein the method further comprises a step of verifying the digital signature used to digitally sign the identification code. This is advantageous because the digital signature provides an extra layer of security supporting the authenticity of the identification tag. Further, the requirement of digitally signing the identification code provides an additional challenge to anyone trying to tamper with the authentication process.

In an embodiment, the identification code is digitally signed using the private key of a cryptographic public-private key pair. This is advantageous as public-private key pair cryptography is a well-known and secure method of applying digital signatures and encryption to information.

In an embodiment, the public key of the cryptographic public-private key pair is used to confirm the digital signature used to digitally sign the identification code. This is advantageous as it verifies the private key is the authentic pair to the public key, without revealing the private key.

In an embodiment, the identification code is used to obtain the public key from the remote database. By obtaining the public key from the remote database, the public key can be trusted, adding further authenticity to the steps of verifying the public-private key pair. This is advantageous as it adds an additional challenge to anyone trying to tamper with the authentication process.

In an embodiment, the method further comprises steps of: providing the identification tag with a challenge message; obtaining from the identification tag, in response to the challenge message, a response message that is digitally signed with a digital signature; and verifying the digital signature. This is advantageous as it allows for the authenticity of the digital signature applied by the identification tag to be verified. This adds further security to the authentication process, while also adding additional challenges to anyone wishing to tamper with the authentication process.

In an embodiment, the response message is digitally signed using the private key of a cryptographic public-private key pair. This is advantageous as public-private key pair cryptography is a well-known and secure method of applying digital signatures and encryption to information.

In an embodiment, the digital signature of the response message is verified using the public key of the cryptographic public-private key pair. This is advantageous as it verifies the private key is the authentic pair to the public key, without revealing the private key.

In an embodiment, the identification code is used to obtain the public key from the remote database. By obtaining the public key from the remote database, the public key can be trusted, adding further authenticity to the steps of verifying the public-private key pair. This is advantageous as it adds an additional challenge to anyone trying to tamper with the authentication process.

According to a second aspect, there is provided an identification tag for use in implementing a method according to the present disclosure, the identification tag comprising: a communication interface for communicating with an external device; a computer memory; and a controller; wherein the computer memory is configured to store an identification code for identifying the identification tag, and to store a tag authentication code corresponding to the number of times the identification tag has previously been authenticated.

According to a third aspect, there is provided a system for implementing the method of the present disclosure.

BRIEF DESCRIPTION OF THE DRAWINGS

Examples of the present disclosure will now be described in detail with reference to the accompanying drawings, in which.

DETAILED DESCRIPTION

According to the present disclosure, there is provided a method for using a remote database to authenticate an identification tag. By using the method according to the present disclosure, the identity and authenticity of the identification tag can be quickly and securely confirmed. In some examples, an identification tag according to the present disclosure can be attached to and/or incorporated into a product in order to confirm the authenticity of said product. By confirming the identity of the identification tag in a unique and secure manner, the present method allows for consumer safety, brand integrity, and economic stability to be maintained with a high degree of confidence.

Figure 1:
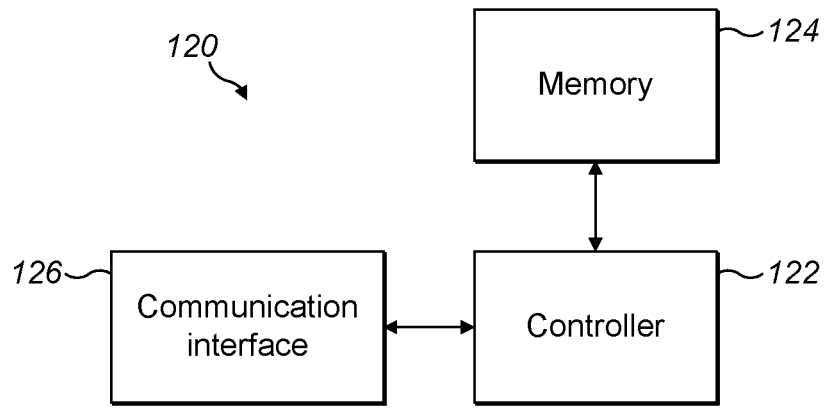
FIG. 1 is a flow chart illustrating the steps of the method according to the present disclosure.

An example of an identification tag according to the present disclosure is illustrated in FIG. 1. As shown in FIG. 1, an identification tag 120 according to the present disclosure may comprise a controller 122, a computer memory 124, and a communication interface 126. The controller 122 is configured to control the functionality of the identification tag 120. The controller 122 may comprise a central processing unit (CPU) and/or one or more hardware controllers. The computer memory 124 is configured to store information and instructions for the operation of the identification tag 120. The computer memory 124 may comprise a combination of writable and read-only memory. The computer memory 124 may comprise one or more memory management units (MMU) configured to manage the computer memory 124. The communication interface 126 is configured to allow information to be transferred between the identification tag 120 and an external device (not shown). The communications interface 126 may be configured for use with any suitable wireless and/or wired communications method, and for use with one or more standard communications protocols. In some examples, the communications interface 126 is configured to use near field communication protocols. In some examples, the communications interface 126 is configured to use the ISO 144434 communication protocol.

Figure 2:
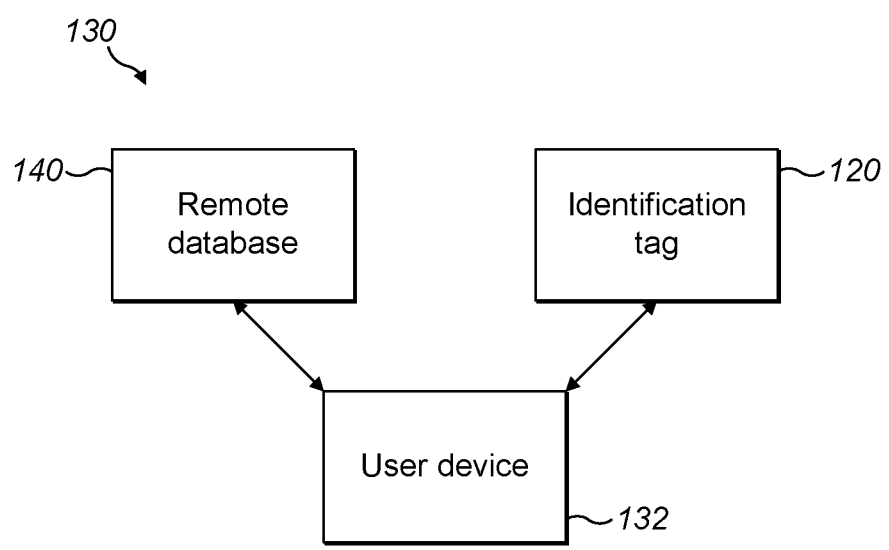
FIG. 2 is a block diagram of components that could be included in an identification tag according to the present disclosure.

An illustrated in FIG. 2, the method according to the present disclosure may be implemented as part of a system. The system 130 illustrated in FIG. 2 comprises an identification tag 120, a remote database 140 and a user device 132. The user device 132 is configured to communicate with the communications interface 126 of the identification tag 120, and to obtain information from the remote database 140. The user device 132 may be any suitable device, for example a bespoke device designed specifically for the purpose, or alternatively any conventional computer system such as, for example, a smart phone, a laptop computer, a tablet computer, or a desktop computer. In some examples, at least part of a method according to the present disclosure is performed by the user device 132.

Figure 3:
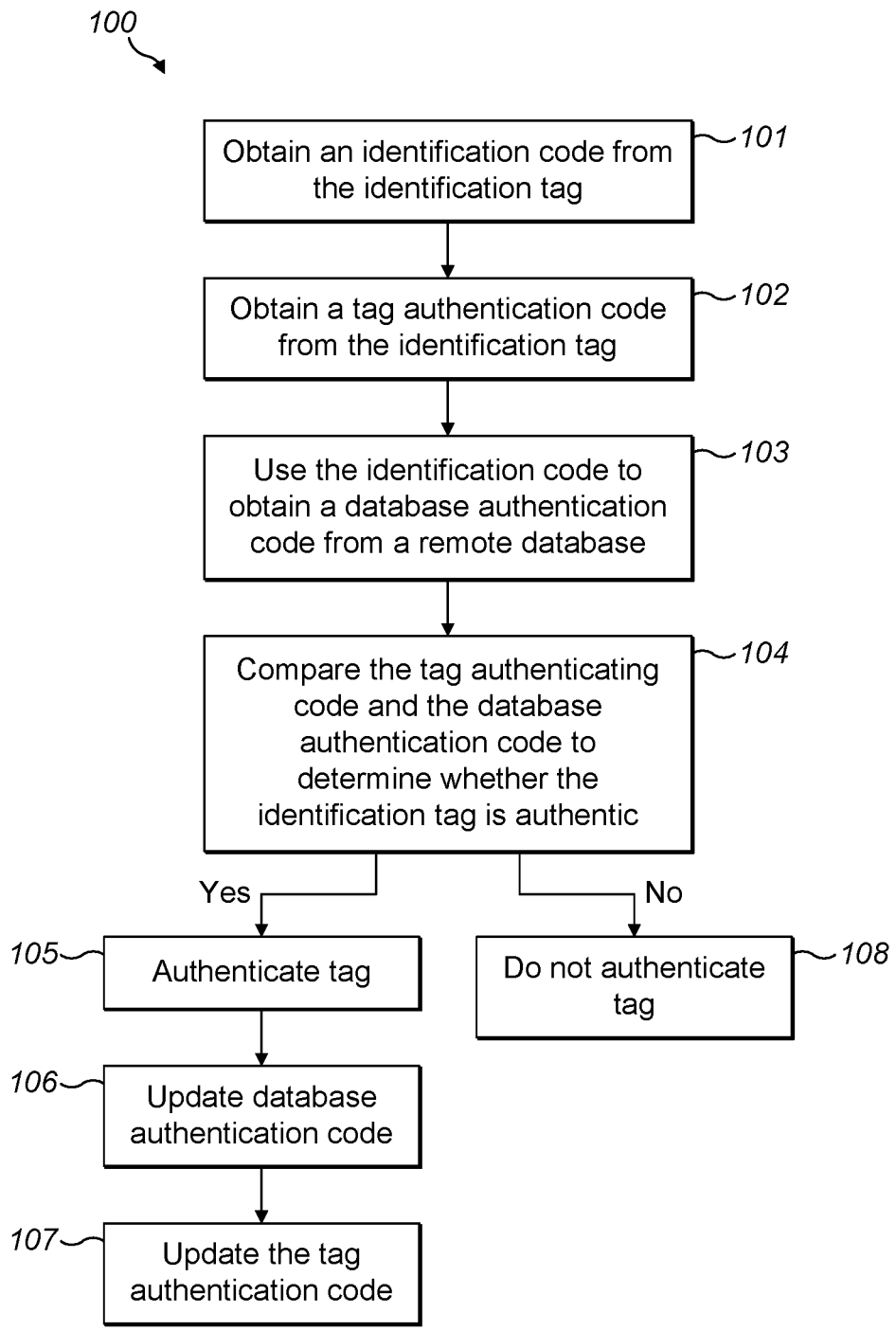
FIG. 3 is a flow diagram illustrating an example of a method according to the present disclosure.

An example of a method 100 according to the present disclosure will now be explained in detail in relation to the flow chart illustrated in FIG. 3. In a first step 101, an identification code is obtained from the identification tag 120. The identification code is a unique identification code that is associated with the identification tag 120. The purpose of the identification code is to be able to uniquely identify the identification tag 120. The identity of the identification tag 120 is claimed by the identification code, with the authenticity of the identification code being confirmed through the subsequent steps of the method.

The identification code is stored in the computer memory 124 of the identification tag 120. In some examples, the identification code may be stored in read-only memory or may otherwise be stored in a manner that cannot be overwritten. In some examples, the identification code may be encrypted when stored.

In some examples, the step 101 of obtaining the identification code may involve transmitting the identification code to an external user device 132 through the communications interface 126 of the identification tag 120. In some examples, the identification code may be hashed or otherwise cryptographically encrypted before it is transmitted from the identification tag 120 to an external device.

In a second step 102, a tag authentication code is obtained from the identification tag 120. The tag authentication code corresponds to the number of times that the identification tag 120 has previously been authenticated using the remote database 140. The tag authentication code is obtained from the computer memory 124 of the identification tag 120. In some examples, the tag authentication code may be a number corresponding to the exact number of times the identification tag 120 has previously been authenticated using the remote database.

In some examples, the tag authentication code may be obfuscated such that although it corresponds to the number of times the identification tag 120 has been authenticated, it does not represent the exact number of times the identification tag 120 has been authenticated using the remote database. The obfuscation may involve, for example, the use of a function to convert the number of times the identification tag 120 has been authenticated into an obfuscated value. In other examples, the authentication code may be a pseudo-random number that is iterated in a predetermined manner each time that the identification tag 120 is authenticated. The authentication code being obfuscated, rather than being an exact representation of the number of times the identification tag 120 has been authenticated may be advantageous in increasing the difficulty associated with any attempt to duplicate the identification tag 120, or otherwise interfere with the authentication method.

In a third step 103, the identification code obtained from the identification tag 120 is used to obtain a database authentication code from a remote database. The database authentication code corresponds to the number of times that the remote database has been used to authenticate the identification tag 120 using the remote database. As with the tag authentication code, the database authentication code may be a number corresponding to the exact number of times the identification tag 120 has been authenticated using the remote database, or the value may be obfuscated.

In a fourth step 104, the obtained database authentication code and the obtained tag authentication code are compared. Essentially, the comparison is performed to ensure that there is no discrepancies between the information stored on the identification tag 120 and in the remote database 140. The comparison should result in agreement between the database authentication code and the obtained tag authentication code as to the number of times the identification tag 120 has been authenticated using the remote database 140. If the comparison indicates no discrepancies, then the identification tag 120 is authenticated 105. If discrepancies are identified, the identification tag 120 is not authenticated 108. In some examples, the result of the comparison step may be recorded.

In an example where the method is conducted using a user device 132, the result of the comparison step (i.e., whether the identification tag 120 is authenticated or not) may be output using the user device 132. In some examples, the user device 132 may indicate the result of the comparison step to a user. Additionally, or alternatively, the result of the comparison step may be transmitted to another user remotely. For example, if the result is that the identification tag 120 is not authenticated, the possible detection of a identification tag 120 that has been tampered with in some manner (thereby causing the failed authentication) may be recorded and/or transmitted.

The comparison step may involve any suitable method for identifying discrepancies between the information stored in the remote database and on the identification tag 120. In the simplest example, where each of the database authentication code and the tag authentication record the exact number of times that the identification tag 120 has been authenticated using the remote database, the two values can simply be compared and an exact match is needed in order to confirm agreement. However, as discussed above, obfuscation may be used in one or both of the authentication codes. Furthermore, regardless of whether obfuscation is used in the storage of the authentication codes, the codes may be hashed or otherwise encoded before transmitting. Any such methods must be taken into account when performing the comparison step, such that regardless of the steps taken to obfuscate and/or encode the information, the comparison step is able to accurately determine whether the information obtained from the remote database is in agreement with the information obtained from the identification tag 120.

If the comparison step 104 results in the identification tag 120 being authenticated, the record of the number of times the identification tag 120 has been authenticated using the remote database 140 needs to be updated. In a further step 106, the database authentication code stored in the remote database is updated to reflect the fact that the identification tag 120 has been authenticated using the remote database. In a further step 107, the tag authentication code stored in the memory 124 of the identification tag 120 is updated to reflect the fact that the identification tag 120 has been authenticated using the remote database 140.

In some examples, the updating steps 106 and 107 may involve simply incrementing the stored values that correspond to the number of times the identification tag 120 has been authenticated using the remote database 140. In other examples, one or more functions may be used in order to determine a new value to be recorded in the remote database 140 and/or the computer memory 124 of the identification tag 120.

In some examples, the stored values for the updated database authentication code and the updated tag authentication code may be identical. In other examples, they may be obfuscated in different ways such that they are not identical. Examples where the stored values are not identical may be advantageous, as it may increase the difficulty associated with attempts to compromise the security of the authentication method. For example, in examples where the stored values are different, even if an adversary were able to obtain one of the values (for example, the database authentication code corresponding to the identification tag 120) they would not be able to easily determine the corresponding tag authentication code. This may be particularly advantageous in examples where the remote database 140 comprises a public leger, which may be easily readable for a third party.

Figure 4:
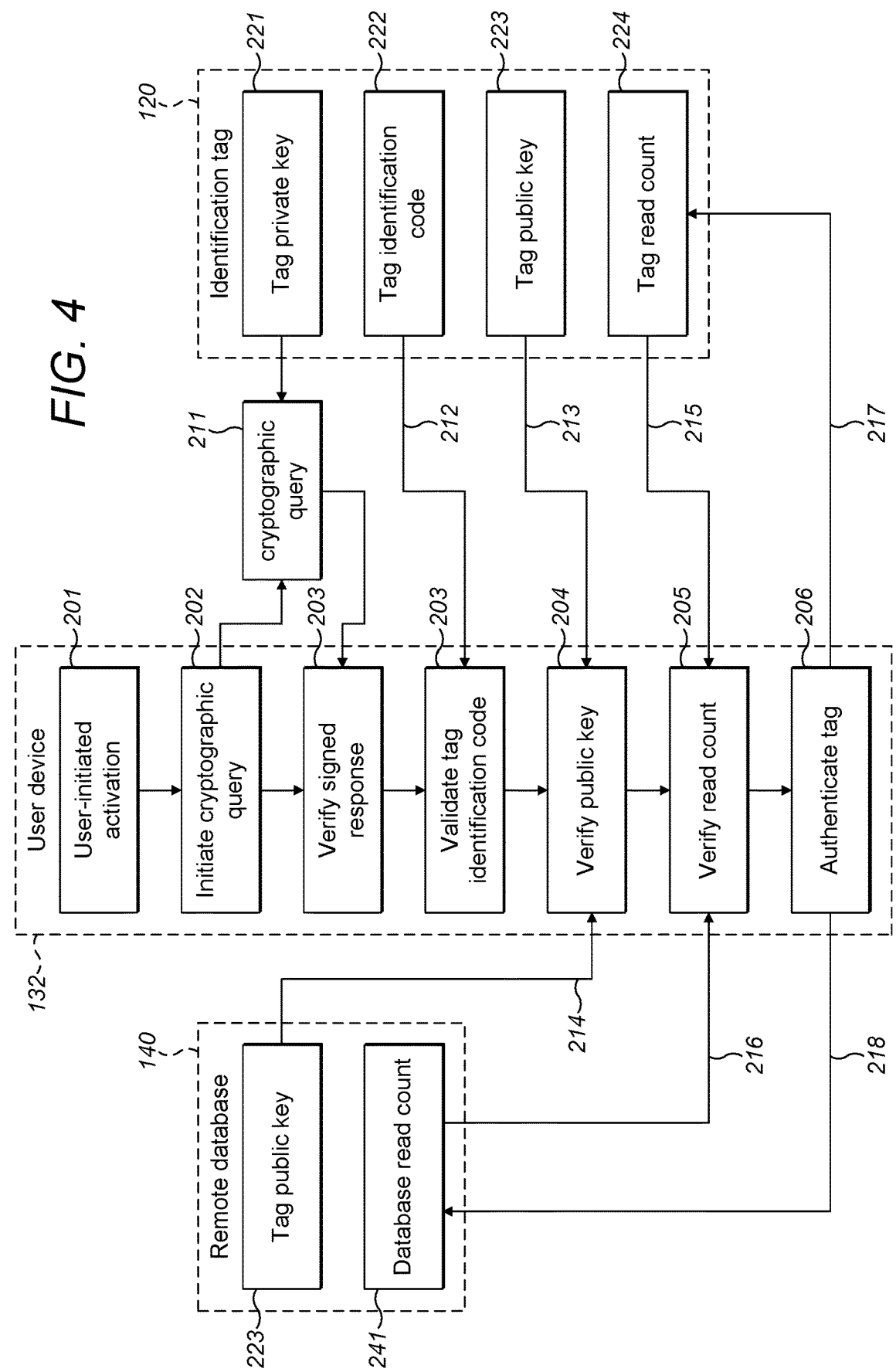
FIG. 4 is a flow diagram illustrating an example of a further method according to the present disclosure.

An example of a possible implementation of the authentication method is illustrated in FIG. 4. FIG. 4 illustrates a method implemented using a remote database 140, an identification tag 120 and a user device 132.

In a first step, a user initiates authentication of an identification tag 120 using a user device 132 by initiating a user-initiated activation 201. The user-initiated activation 201 may involve, for example, the user scanning the authentication tag 120 using the user device 132. Scanning may involve initiating a wireless communication between the user device 132 and the identification tag 120. In some examples, the identification tag 120 may comprise an NFC chip, and the user-initiated activation 201 may involve activating the NFC chip allowing for communication between the user device 132 and the identification tag 120. In other examples, alternative wireless (or even wired) communications may be initiated.

In the illustrated example, following a user-initiated activation 201, the user device 132 the user device 132 then performs a step of initiating a cryptographic query 202. The cryptographic query 211 may involve a challenge message being transmitted from the user device 132 to the identification tag 120. In some examples, the challenge message may be signed using a cryptographic encryption key.

In response to receiving the challenge message, the identification tag 120 provides a response message. In the illustrated example, the response message is signed by the identification tag 120 using the tag private key 221. The tag private key 221 is the private key of a public-private key pair. By signing the response message using the tag private key 221, the signature of the message and thus the tag private key 221 can be verified by the user device 132. This can help indicate the authenticity of the identification tag 120.

In the illustrated example, the cryptographic query 211 is then verified 203 by the user device 132. In some examples, the cryptographic query is verified by authenticating the cryptographic signature applied to the response message by the identification tag 120. In examples where the response message is signed using the tag private key 221, the public key corresponding to the tag private key 221 may be used to authenticate the signature. In such examples, the public key corresponding to the tag private key 221 may be stored remotely, such as in a remote database 140. In such examples, the user device 132 may obtain the public key from the remote source and use it to verify the cryptographic signature applied to the response message by the identification tag 120, thereby verifying the authenticity of the tag private key 221.

In the illustrated example, the tag identification code 222 is then obtained 212 from the identification tag 120. In some examples, the tag identification code 222 may then be verified 203 by the user device 132. The verification process may involve, for example, confirming that the format of the tag identification code 222 conforms to predetermined requirements.

In some examples, the identification tag 120 may provide to the user device 132 a tag public key 223 that corresponds to the tag private key 221. In such examples, and as illustrated in FIG. 4, the user device 132 may verify the tag public key 223 provided by the identification tag 120. Verifying the tag public key 223 may involve, for example, comparing the tag public key 223 provided to the user device 132 by the identification tag 120 to a public key obtained from a remote source, such as a remote database. In the illustrated example, the user device 132 obtains 214 the tag public key 223 from a remote database 140. The user device 132 then verifies the tag public key 223 obtained from the identification tag 120, using the tag public key 223 obtained from the remote database 140.

In the illustrated example, the user device 132 performs a step of verifying the read count 205 of the identification tag 120. In this step, the user device 132 obtains 215 from the identification tag 120, the tag read count 224. The tag read count 224 is a value that corresponds to the number of times that the identification tag 120 has previously been verified. In some examples, the tag read count 224 may be a value equal to the number of times the tag has previously been verified. In other examples, this value may be obfuscated in some way to prevent the exact value from being easily read by an unauthorised third-party. The tag read count 224 is an example of a tag authentication code discussed previously in this disclosure.

The user device 132 obtains 216 from a remote database 140 a database read count 241. The database read count 241 is a value that corresponds to the number of times that the identification tag 120 has previously been verified. In some examples, the database read count 241 may be a value equal to the number of times the tag has previously been verified. In other examples, this value may be obfuscated in some way to prevent the exact value from being easily read by an unauthorised third-party. The database read count 241 is an example of a database authentication code discussed previously in this disclosure.

The user device compares the tag read count 224 and the database read count 241, in order to verify 205 the read count. In some examples, where obfuscation is not used, this may involve directly comparing the two values in order to determine whether they exactly match. In examples where one or both values are obfuscated, the comparison step involves additional steps that allow for the obfuscated values to be compared.

Although the illustrated example involves performing the above described steps in the order illustrated in FIG. 4, it should be appreciated that any of the above described steps after the user-initiated activation 201 can be performed in any order.

Furthermore, in some examples one or more of the above described steps may be omitted, other than the step of verifying the read count 205. The identification tag 120 will only be authenticated if all of the performed verification steps indicate that the identification tag 120 is authentic.

If any of the performed verification steps fails to confirm the authenticity of the identification tag 120, the authentication process is terminated and the identification tag 120 is determined not to be authentic. In such examples, the user device 132 may alert the user to the fact that the tag has not been authenticated.

If all of the performed verification steps confirm the authenticity of the identification tag 120, the user device 132 then authenticates 206 the identification tag 120. Once all of the verification steps have been performed, and the identification tag 120 is determined to be authentic, the user device 132 then updates the tag read count 224 and the database read count 241. The steps of updating 217 the tag read count 224 and updating 218 the database read count 241 ensures that the tag read count 224 and the database read count 241 continue to correspond to the number of times the identification tag 120 has been authenticated. In an example where the identification tag 120 has been duplicated, the tag read count contained within the duplicate tag will no longer correspond to the database read count 241, and so the duplicate tag will not be authenticated when checked.

Further examples of possible implementations of a method, device and system according to the present disclosure will now be discussed.

In one example, the authentication system comprises a microchip "Cifr Chip", which can be embedded in a device or carried by an individual, stores unique identifying information and cryptographic keys. This information is used to verify the identity of the user or device attempting to access a system or network.

The authentication system may utilise a decentralized blockchain network to store and validate the authenticity of the information stored on the microchip. The blockchain ensures the integrity and security of the data, as it is distributed across multiple nodes and can only be updated with the consensus of the network.

A combination of the microchip and blockchain technology may allow for a secure and efficient authentication process that can be utilized in a variety of applications. The use of this system can significantly improve the security and reliability of authentication processes, helping to prevent fraud and provide a way to ensure a physical item is authentic.

In some examples, in addition to utilizing a microchip and blockchain technology, this authentication system may incorporates three novel mechanisms to ensure the reliability and security of the system. These mechanisms include proof of counts, proof of identity, and proof of history. These mechanisms will be broken down in further details below.

"Proof of counts" involves tracking the number of times a microchip has been read, and using this information to verify the authenticity of the chip. This prevents any attempts to use fast computation to crack the private key as to increment one count, one needs to have one successful scan and read. Otherwise, the system will detect a correct private key but with wrong count reads and it would kick it out of the system.

"Proof of identity" utilizes a unique public key and UID (unique identifier) associated with each microchip to verify the identity of the of each microchip attempting to access the system. The public key can not be reproduced, as it is derived from the private key and it is used to decipher the encrypted message from the private key.

"Proof of history" involves checking the previous data stored on the blockchain and comparing it to the current data in order to verify the authenticity of the information. This helps to prevent the tampering or manipulation of data, ensuring that the information stored on the microchip and on the blockchain is accurate and up-to-date.

Together, these mechanisms provide a robust and reliable authentication system that can be used to secure a wide range of applications and systems. Examples of such a system will now be explained in further details below.

In one example, the authentication system of the present invention comprises a cryptographic key generator utilizes advanced algorithms to generate the keys using elliptic curve cryptography, which are designed to be virtually impossible to reverse engineer or recreate. This ensures that the keys are secure and cannot be compromised by hackers or other malicious actors.

The system further comprises a microchip processor having a self-attestation system hardcoded within the processor. The self-attestation system is a mechanism that is configured to attest to the processor configuration in response to a request from a remote device through the communications system. This allows the processor to verify that the private key was generated by the cryptographic key generator within the processor, rather than being generated externally.

In some embodiments, the cryptographic key generator in this system is configured to generate the private key and public key using microcode only, without the use of firmware or software. Microcode is a type of low-level code that is stored within a microprocessor or other hardware device and is used to execute specific instructions.

By using microcode to generate the keys, the cryptographic key generator is able to operate in a more secure and efficient manner. This is because microcode is typically stored within the hardware itself and is not accessible to external software or firmware. As a result, the keys generated by the cryptographic key generator may be less vulnerable to tampering or compromise by external parties. In addition, the use of microcode may allow the cryptographic key generator to operate faster and more efficiently, as it does not need to rely on external software or firmware to execute instructions. This can help to improve the overall performance and reliability of the system.

The Cifr Chip is a small, powerful microchip that utilizes advanced encryption techniques to provide unparalleled security. It is based on the Java card platform and is designed to provide unbeatable security. One of the key features of the Cifr Chip is its compact size. In one example, the Cifr Chip is 28 mm in diameter, making it easy to integrate into a wide range of objects. It is also contactless, using NFC (Near Field Communication) technology to communicate with other devices, such as smartphones.

In addition to its advanced encryption capabilities, the Cifr Chip is also designed to be durable. It is water resistant and chemical resistant, making it suitable for integration into clothing and other objects that may be exposed to harsh conditions. It is also sturdy and able to withstand physical wear and tear.

The Cifr Chip can be easily and securely authenticated using any user device, such as a smartphone, and an application such as the Cifr app. This app utilizes a combination of blockchain data, unique encryption keys, unique public keys, proof of counts, and proof of history to validate each Cifr Chip.

The Cifr Chip uses immutable key storage and signing functions that are designed to be unmodifiable, once generated. These functions are stored in a non-programmable secure element of the chip, which is capable of signing data using any suitable cryptographic encryption, such as an independent ECDSA (Elliptic Curve Digital Signature Algorithm) key pair. In some examples, the internal signing function can be used to generate signatures that can later be decrypted using the public key.

Unlike alternative authentication systems such as traditional Java smart cards, the Cifr Chip does not use a secure element that permits for general programmability. Instead, it has only immutable cryptographic functions, which eliminates the need for an operating system or additional firmware trust requirements. This makes the Cifr Chip more secure for high-level authentication compared to smart cards, which have cryptographic functions specified in Java applets and may offer dangerous interfaces that allow for the extraction of private keys.

Overall, the use of microcode in the cryptographic key generator helps to ensure the security and efficiency of the authentication process.

An authentication system according to the present disclosure provides a method which, in some examples, may comprise any of the following steps:

(a) a user initiates the authentication process by tapping the microchip using a user device, communicating with the chip using any suitable technology, such as NFC. This activates the microchip and allows it to communicate with the user device.

(b) a challenge response is sent to the microchip, which is used to verify the identity of the user. This challenge response is typically encrypted and signed using a cryptographic algorithm, such as elliptic curve cryptography.

(c) the microchip receives the challenge response and responds by signing it with its private key. This signed signature is then returned to the user device.

(d) the user device receives the signed signature and verifies it using the microchip's public key. If the signature is valid, the app proceeds to the next step. If the signature is invalid, the authentication process is terminated.

(e) the user device checks the read counts using the proof of counts mechanism. This involves comparing the number of successful reads recorded on the blockchain with the current number of reads. If the counts match, the process proceeds to the next step. If the counts do not match, the authentication process is terminated.

(f) the user device checks the public key and UID against the data stored on the blockchain. If the data matches, the authentication process is successful. If the data does not match, the process is terminated.

(g) if the authentication process is successful, the user device informs the user. This may involve, for example, returning a successful authentication message and displaying the information associated with the microchip, including any relevant item information.

The authentication (Cifi) system is designed to provide a secure and reliable authentication process that utilizes both a microchip and blockchain technology. The use of a challenge response, proof of counts, and a public key/UID check helps to ensure the integrity and authenticity of the user data, making it a strong choice for a wide range of applications.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

The invention claimed is:

1. A method for using a remote database to authenticate an identification tag, the method comprising steps of:
obtaining from the identification tag an identification code and a tag authentication code, wherein the tag authentication code corresponds to the number of times the identification tag has previously been authenticated using the remote database;
using the identification code to obtain a database authentication code from the remote database, wherein the database authentication code corresponds to the number of times the identification tag has previously been authenticated using the remote database; and
comparing the database authentication code to the tag authentication code to determine if the identification tag is authentic and if the identification tag is determined to be authentic, performing the further steps of:
updating the database authentication code such that it corresponds to the number of times the identification tag has been authenticated; and
updating the tag authentication code such that it corresponds to the number of times the identification tag has been authenticated.

2. The method according to claim 1, wherein the remote database comprises a distributed ledger.

3. The method according to claim 2, wherein the distributed ledger comprises one or more blockchains.

4. The method according to claim 1, wherein the remote database comprises a centralised database.

5. The method according to claim 1, wherein the obtained identification code is digitally signed by the identification tag.

6. The method according to claim 5, wherein the method further comprises a step of verifying the digital signature used to digitally sign the identification code.

7. The method according to claim 1, wherein the identification code is digitally signed using the private key of a cryptographic public-private key pair.

8. The method according to claim 7, further comprising using the public key of the cryptographic public-private key pair to confirm the digital signature used to digitally sign the identification code.

9. The method according to claim 8, wherein the identification code is used to obtain the public key from the remote database.

10. The method according to claim 1, further comprising steps of:
providing the identification tag with a challenge message;
obtaining from the identification tag, in response to the challenge message, a response message that is digitally signed with a digital signature; and
verifying the digital signature.

11. The method according to claim 10, wherein the response message is digitally signed using the private key of a cryptographic public-private key pair.

12. The method according to claim 11, wherein the digital signature of the response message is verified using the public key of the cryptographic public-private key pair.

13. The method according to claim 12, wherein the identification code is used to obtain the public key from the remote database.

14. The method according to claim 1, further comprising a step of authenticating the identification tag.

15. An identification tag for use in implementing the method according to claim 1, the identification tag comprising:
- a communication interface for communicating with an external device;
- a computer memory; and
- a controller;
- wherein the computer memory is configured to store an identification code for identifying the identification tag, and to store a tag authentication code corresponding to the number of times the identification tag has previously been authenticated.

16. A system for implementing the method according to claim 1, the system comprising:
- an identification tag;
- a remote database; and
- a user device configured to interact with the identification tag and the remote database.

17. The system according to claim 16, wherein the identification tag comprises a communication interface for communicating with an external device;
- a computer memory; and
- a controller;
- wherein the computer memory is configured to store an identification code for identifying the identification tag, and to store a tag authentication code corresponding to the number of times the identification tag has previously been authenticated.

* * * * *